(12) United States Patent
Bassford et al.

(10) Patent No.: US 12,197,853 B2
(45) Date of Patent: Jan. 14, 2025

(54) BUNDLED AND CUSTOMIZABLE DOCUMENTATION-VIEWER FOR APPLICATION FOR INCREASED ASCCESSIBLITY

(71) Applicant: Dell Products L.P., Round Rock, TX (US)

(72) Inventors: Jason Bassford, Toronto (CA); Brianna Stevenson, Waterloo (CA)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/718,464

(22) Filed: Apr. 12, 2022

(65) Prior Publication Data

US 2023/0325591 A1 Oct. 12, 2023

(51) Int. Cl.
| | |
|---|---|
| *G06F 40/197* | (2020.01) |
| *G06F 3/04842* | (2022.01) |
| *G06F 3/04847* | (2022.01) |
| *G06F 16/957* | (2019.01) |
| *G06F 40/106* | (2020.01) |
| *G06F 40/143* | (2020.01) |

(52) U.S. Cl.
CPC ........ *G06F 40/197* (2020.01); *G06F 3/04847* (2013.01); *G06F 16/9577* (2019.01); *G06F 40/106* (2020.01); *G06F 40/143* (2020.01); *G06F 3/04842* (2013.01)

(58) Field of Classification Search
CPC .... G06F 40/197; G06F 40/143; G06F 40/106; G06F 16/9577; G06F 3/04847; G06F 3/04842
See application file for complete search history.

(56) References Cited

U.S. PATENT DOCUMENTS

| | | | | |
|---|---|---|---|---|
| 6,615,258 | B1 * | 9/2003 | Barry | G06Q 30/06 707/E17.107 |
| 7,721,205 | B2 * | 5/2010 | Morgan | G06F 40/103 715/273 |
| 9,338,399 | B1 * | 5/2016 | Franco | G06F 16/958 |
| 2003/0030659 | A1 * | 2/2003 | Wu | G06F 16/957 707/E17.119 |
| 2005/0071758 | A1 * | 3/2005 | Ehrich | G06F 9/451 715/234 |
| 2006/0072804 | A1 * | 4/2006 | Watson | G16H 40/67 382/133 |
| 2009/0049403 | A1 * | 2/2009 | Jones | G06Q 30/02 715/810 |
| 2009/0064005 | A1 * | 3/2009 | Cunningham | G11B 27/322 715/764 |
| 2009/0259926 | A1 * | 10/2009 | Deliyannis | G06F 16/951 715/205 |
| 2012/0144303 | A1 * | 6/2012 | Cricks | G06Q 30/0241 709/219 |

(Continued)

*Primary Examiner* — Thu V Huynh
(74) *Attorney, Agent, or Firm* — Krishnendu Gupta; Lesley Leonessa

(57) ABSTRACT

Methods, system, and non-transitory processor-readable storage medium for content viewer system are provided herein. An example method includes receiving a content viewer in which to render content in response to a request to receive the content. The content viewer comprises the content and a graphical user interface and rendering the content in the content viewer.

19 Claims, 8 Drawing Sheets

(56) References Cited

U.S. PATENT DOCUMENTS

| | | | |
|---|---|---|---|
| 2012/0233536 A1* | 9/2012 | Nagata | G06F 16/9577 |
| | | | 715/234 |
| 2013/0018939 A1* | 1/2013 | Chawla | H04L 67/08 |
| | | | 709/203 |
| 2013/0097522 A1* | 4/2013 | Devries | G06Q 10/103 |
| | | | 715/745 |
| 2013/0298084 A1* | 11/2013 | Spivack | H04L 65/403 |
| | | | 705/14.67 |
| 2014/0067913 A1* | 3/2014 | von Haden | H04L 67/5682 |
| | | | 711/119 |
| 2014/0280482 A1* | 9/2014 | Crosley | G06F 16/958 |
| | | | 709/203 |
| 2014/0298154 A1* | 10/2014 | He | G06F 9/44526 |
| | | | 715/234 |
| 2023/0105830 A1* | 4/2023 | Weisman | G06Q 30/0251 |
| | | | 707/706 |

* cited by examiner

BUNDLED AND CUSTOMIZABLE DOCUMENTATION-VIEWER FOR APPLICATION FOR INCREASED ASCCESSIBLITY

FIELD

The field relates generally to rendering content in an application, and more particularly to increasing accessibility to content in information processing systems.

BACKGROUND

Countless documents are accessed online daily. Accessibility, particularly for those users with disabilities, therefore, is critical to all users who wish to access online content, and also those who provide online content.

SUMMARY

Illustrative embodiments provide techniques for implementing a content viewer system in an information processing system. For example, illustrative embodiments, receive a content viewer in which to render the content in response to a request to receive content, where the content viewer comprises the content and a graphical user interface. The content viewer renders the content. Other types of processing devices can be used in other embodiments. These and other illustrative embodiments include, without limitation, apparatus, systems, methods and processor-readable storage media.

DETAILED DESCRIPTION

Figure 1:
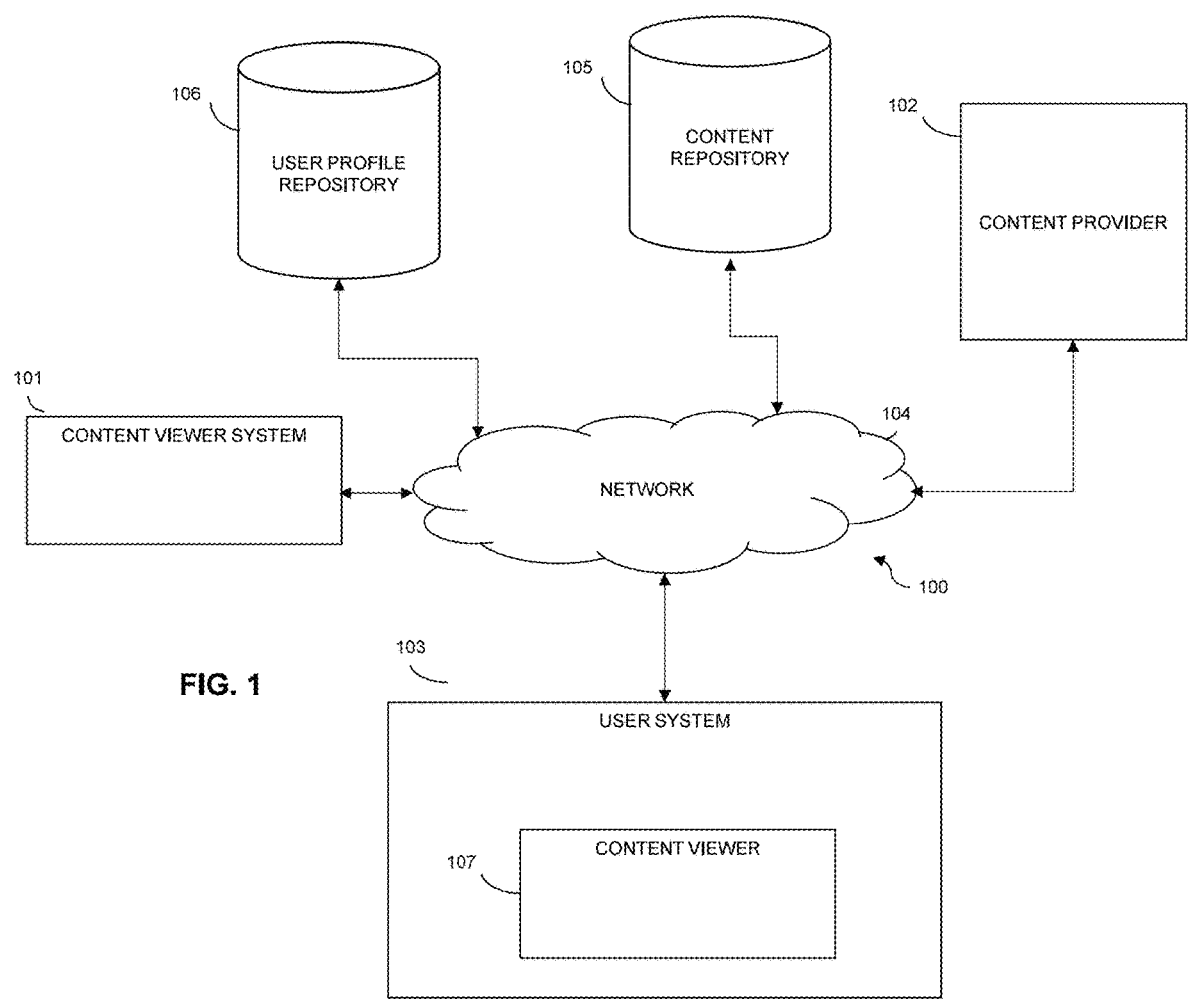
FIG. 1 shows an information processing system including a content viewer system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a content viewer system, which technique may be used to provide, among other things, accessibility to content by rendering content in a content viewer in response to a request to receive content, where the content viewer comprises the content and a graphical user interface.

Countless documents are accessed online each day. Different users have different needs to ensure the content is accessible to them. Often the appearance of online content needs to be customized to make the content accessible for users, particularly users with disabilities.

Conventional technologies for customizing the appearance of online content require users to know HTML to modify Cascading Style Sheets (CSS) in web based/online content. Conventional technologies do not enable, for example, people with disabilities to have a single, accessible, easy to use, application that combines the ability to change the default presentation of content to suit the user, and provides tools to modify Cascading Style Sheets (CSS) in web based/online content without HTML technical knowledge. Conventional technologies do not provide the ability to change both the appearance of the content and the appearance of the interface of the content viewer. Conventional technologies result in any CSS styling changes disappearing as soon as the web page is refreshed, or when the user navigates away from the web page. Conventional technologies that require HTML technical knowledge are based on the URL of the content; when the URL changes, the CSS styling changes are lost. Conventional technologies require third party content viewers, each of which may render the content differently, and therefore present a different user experience.

By contrast, in at least some implementations in accordance with the current technique as described herein, accessibility to content is improved by rendering content in a content viewer in response to a request to receive content, where the content viewer comprises the content and a graphical user interface.

Thus, a goal of the current technique is to provide a method and a system for providing a content viewer system that can provide a customizable reader. Another goal is to allow users to quickly and easily customize the appearance of any aspect of the online content offline. Another goal is to provide an interface (in effect a front end that exposes the style sheets) that allows users to modify the CSS style used to manipulate the HTML code of the content while not requiring the users to have any understanding of CSS styles and/or HTML.

In at least some implementations in accordance with the current technique described herein, the use of a content viewer system can provide one or more of the following advantages: providing a downloadable content viewer along with the downloaded content, providing a consistent experience when downloading content, providing the ability to customize the appearance of the downloaded content ensuring that the content will look exactly as the user desires each time the user downloads the content, providing accessibility to users with disability who may find it difficult and cumbersome to modify content to their default preferred formatting, and allow users with limited technical knowledge to quickly and easily change the appearance of any aspect of the content as well as the appearance of the content viewer itself.

In contrast to conventional technologies, in at least some implementations in accordance with the current technique as described herein, accessibility to content is improved by rendering content in a content viewer in response to a request to receive content, where the content viewer comprises the content and a graphical user interface.

In an example embodiment of the current technique, the graphical user interface receives modification to the rendering of the content and applies the modifications to the rendered content.

In an example embodiment of the current technique, the content viewer stores the received modification in a user profile repository, where the received modifications are associated with a user requesting the received content.

In an example embodiment of the current technique, the content viewer modifies the appearance of the content within the graphical user interface.

In an example embodiment of the current technique, the content viewer receives at least one modification selection from the graphical user interface from a user and applies the modification selection to the rendering of the content in the graphical user interface.

In an example embodiment of the current technique, at least one modification selection facilitates the user in viewing the content in the graphical user interface.

In an example embodiment of the current technique, at least one modification selection is preset to assist users with viewing difficulties.

In an example embodiment of the current technique, the content viewer system receives the content from a content provider, where the content provider accesses the content from a content repository. The content viewer system creates the content viewer comprising the content and the graphical user interface, and transmits the content viewer in response to the request.

In an example embodiment of the current technique, the content viewer system receives a selection from the graphical user interface to load stored modification into the graphical user interface and applies the stored modifications to the rendering of the content in the graphical user interface.

In an example embodiment of the current technique, the content viewer system accesses stored modifications from a user profile repository, where the stored modifications are associated with a user requesting the received content and applies the stored modifications to the rendering of the content in the content viewer.

In an example embodiment of the current technique, the content viewer system detects the user is logged into a user account when requesting the received content and, based on the logged status, accesses the stored modification from the user profile repository.

In an example embodiment of the current technique, the content viewer system receives a login selection from the graphical user interface from the user, logs the user into a user account, and accesses the stored modification from the user profile repository.

In an example embodiment of the current technique, the content viewer system downloads the content viewer as a self-extracting file for execution on a computer device from which the request originated.

In an example embodiment of the current technique, the request to receive content is a request to download the content viewer from a browser.

In an example embodiment of the current technique, the request to receive content is a request to render online content in a browser.

In an example embodiment of the current technique, the request to receive content is a request to render online content offline.

In an example embodiment of the current technique, the content is an HTML presentation of the content and where the modifications are modifications to the CSS styles used to manipulate the HTML presentation of the content.

FIG. 1 shows a computer network (also referred to herein as an information processing system) 100 configured in accordance with an illustrative embodiment. The computer network 100 comprises a content provider 102, user system 103, content repository 105, and user profile repository 106. The content viewer system 101, content provider 102, user system 103, content repository 105, and user profile repository 106 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a content viewer system 101 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the content viewer system 101, content provider 102, content repository 105, and user profile repository 106 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user system 103 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Also associated with the content viewer system 101 and user system 103 are one or more input-output devices, which illustratively comprise keyboards, displays or other types of input-output devices in any combination. Such input-output devices can be used, for example, to support one or more user interfaces to the content viewer system 101 and user system 103, as well as to support communication between the content viewer system 101 and user system 103 and other related systems and devices not explicitly shown. The user system 103 also may also comprise the content viewer 107 and may use the input-output devices to make selections within the content viewer 107.

Additionally, the content viewer system 101 in the FIG. 1 embodiment is assumed to be implemented using at least one processing device. Each such processing device generally comprises at least one processor and an associated memory, and implements one or more functional modules for controlling certain features of the content viewer system 101.

More particularly, the content viewer system 101 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the content viewer system 101 to communicate over the network 104 with the content provider 102, user system 103, content repository 105, and user profile repository 106 and illustratively comprises one or more conventional transceivers.

A content viewer system 101 may be implemented at least in part in the form of software that is stored in memory and executed by a processor, and may reside in any processing device. The content viewer system 101 may be a standalone plugin that may be included within a processing device.

It is to be understood that the particular set of elements shown in FIG. 1 for the content viewer system 101 involving the content provider 102, user system 103, content repository 105, and user profile repository 106 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the content viewer system 101 can be on and/or part of the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the computer network 100 are possible, in which certain components of the system reside in one data center in a first geographic location while other components of the system reside in one or more other data centers in one or more other geographic locations that are potentially remote from the first geographic location. Thus, it is possible in some implementations of the computer network 100 for the content viewer system 101, content provider 102, user system 103, content repository 105, and user profile repository 106 to reside in different data centers. Numerous other distributed implementations of one or more of the content provider 102, user system 103, content repository 105, and user profile repository 106 are possible. Accordingly, the content viewer system 101 can also be implemented in a distributed manner across multiple data centers.

Additional examples of processing platforms utilized to implement host devices and/or storage systems in illustrative embodiments will be described in more detail below in conjunction with FIGS. 7 and 8.

It is to be appreciated that the above-described features and other features of illustrative embodiments disclosed herein are presented by way of example only and should not be construed as limiting in any way.

An exemplary process of content viewer system 101 in computer network 100 will be described in more detail with reference to, for example, the flow diagram of FIG. 2.

Figure 2:
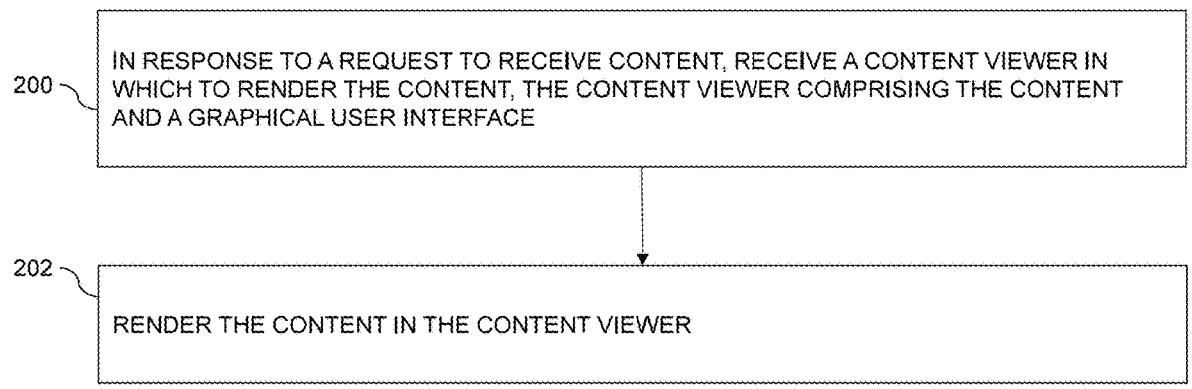
FIG. 2 shows a flow diagram of a process for a content viewer system in an illustrative embodiment.

FIG. 2 is a flow diagram of a process for execution of the content viewer system 105 in an illustrative embodiment. It is to be understood that this particular process is only an example, and additional or alternative processes can be carried out in other embodiments.

In an example embodiment, the content viewer system 101 receives a request for content. In an example embodiment, the request for content is a request to render online content in a browser. In another example embodiment, the request for content is a request to render online content offline. For example, a user, operating the user system 103, may request the content via a browser on the user system 103. The user may navigate to a web page on which the content provider 102 displays the available content. From the web page, the user may select the content to render the online content offline.

At 200, in response to the request to receive content, the content viewer system 105 receives a content viewer 107 in which to render the content. In an example embodiment, the content viewer 107 is downloaded as a self-extracting file for execution on a computer device from which the request originated (for example, the user system 103). In an example embodiment, the content viewer 107 is bundled with the HTML version of the content in a download (for example, to the user system 103) from the content provider 102 as a single, self-extracting file. When the self-extracting file is launched, the content viewer 107 is displayed.

In an example embodiment, the content viewer system 101 receives the content from the content provider 102, where the content provider 102 accesses the content from the content repository 105. The content viewer 107 creates the content viewer 107 comprising the content and the graphical user interface, and transmits the content viewer 107 in response to the request.

Figure 3:
FIG. 3 shows an example graphical user interface of a content viewer in an illustrative embodiment.

The content viewer 107 comprises the content and a graphical user interface. FIG. 3 illustrates an example embodiment of the content viewer 107 where the content is rendered within a graphical user interface. In an example embodiment, a content provider 102 may publish content online that is available to users via a web browser. For example, an entity, such as an information systems manufacturer, may publish online manuals related to the various components and products offered. The online manuals may be presented on a web page within a browser where the user selects a manual for viewing. The manuals may be available in different formats, such as HyperText Markup Language (HTML) or Portable Document Format (PDF). In an example embodiment, the content viewer system 101 may also offer the manual in a content viewer format, where the user selects the content viewer format to receive the content viewer 107 (i.e., as the self-extracting file for execution). In other words, in an example embodiment, the request to receive content is a request to download the content viewer from a browser. In response, the user receives the content viewer 107 bundled with, for example, an HTML version of the content. For example, on a Windows computer, the download may be a .EXE file that launches the content viewer 107 and automatically displays the embedded content.

In an example embodiment, the graphical user interface is easy to understand with quickly understood, and intuitive elements, with plain language descriptions.

Figure 4:
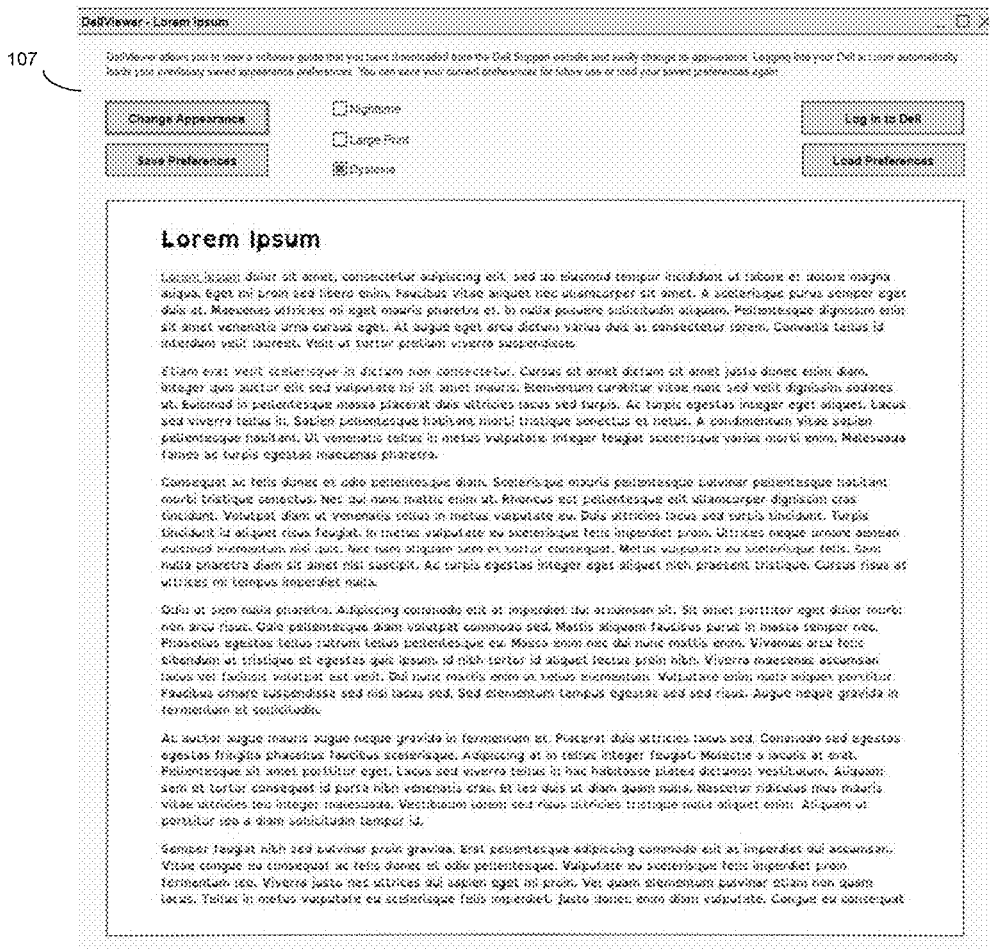
FIG. 4 shows an example graphical user interface of a content viewer with a Dyslexia modification selection applied in an illustrative embodiment.

At 202, the content viewer system 101 renders the content in the content viewer as illustrated in FIGS. 3, 4. 5, and 6. In an example embodiment, the content viewer 107 receives, via the graphical user, modification to the rendering of the content, and applies the modifications to the rendered content, in other words, modifying the appearance of the content within the graphical user interface. For example, in an example embodiment, the content is an HTML presentation of the content, and the modifications are modifications to the CSS styles used to manipulate the HTML presentation of the content as illustrated in FIGS. 3, 4, 5, and 6. In an example embodiment, the content viewer 107 receives at least one modification selection from the graphical user interface from a user, and applies at least one modification selection to the rendering of the content in the graphical user interface. In an example embodiment, the graphical user interface may have several modification selections, and the user may select one or more of the modification selections to be applies to the rendered content in the graphical user interface.

Figure 5:
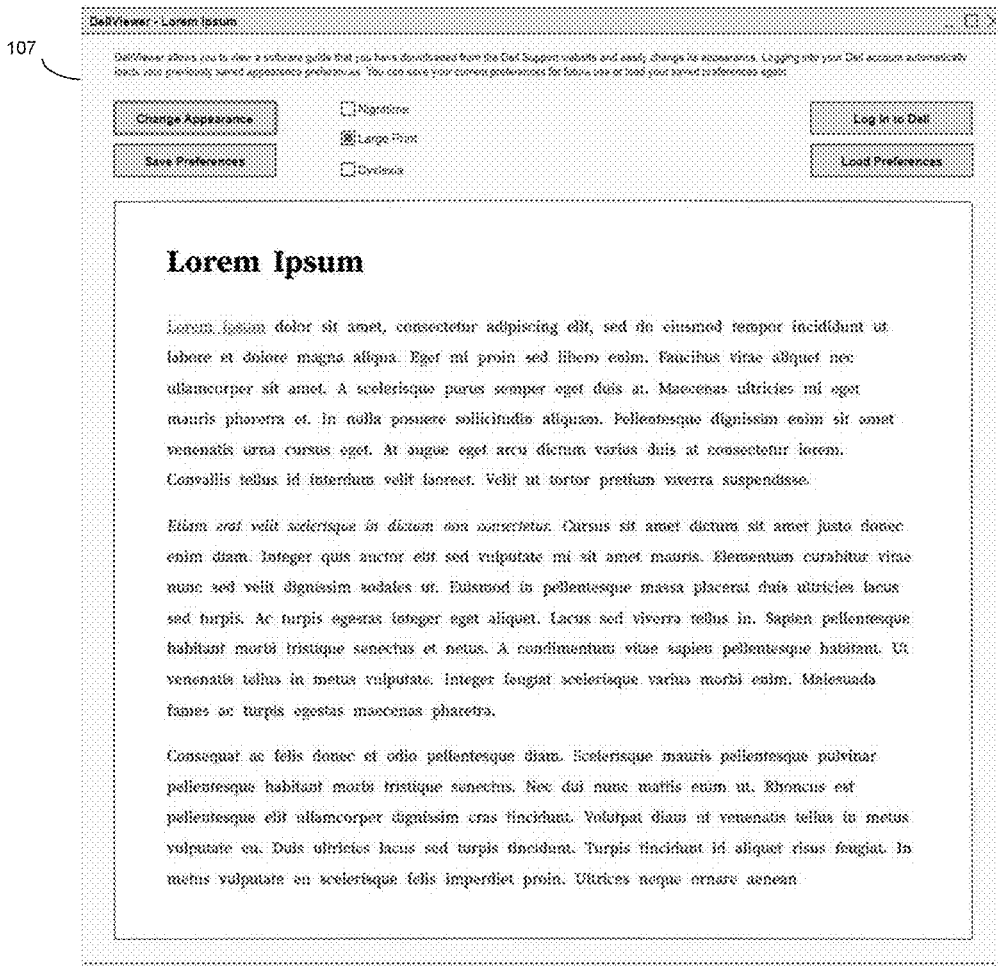
FIG. 5 shows an example graphical user interface of a content viewer with a Large Print modification selection applied in an illustrative embodiment.
Figure 6:
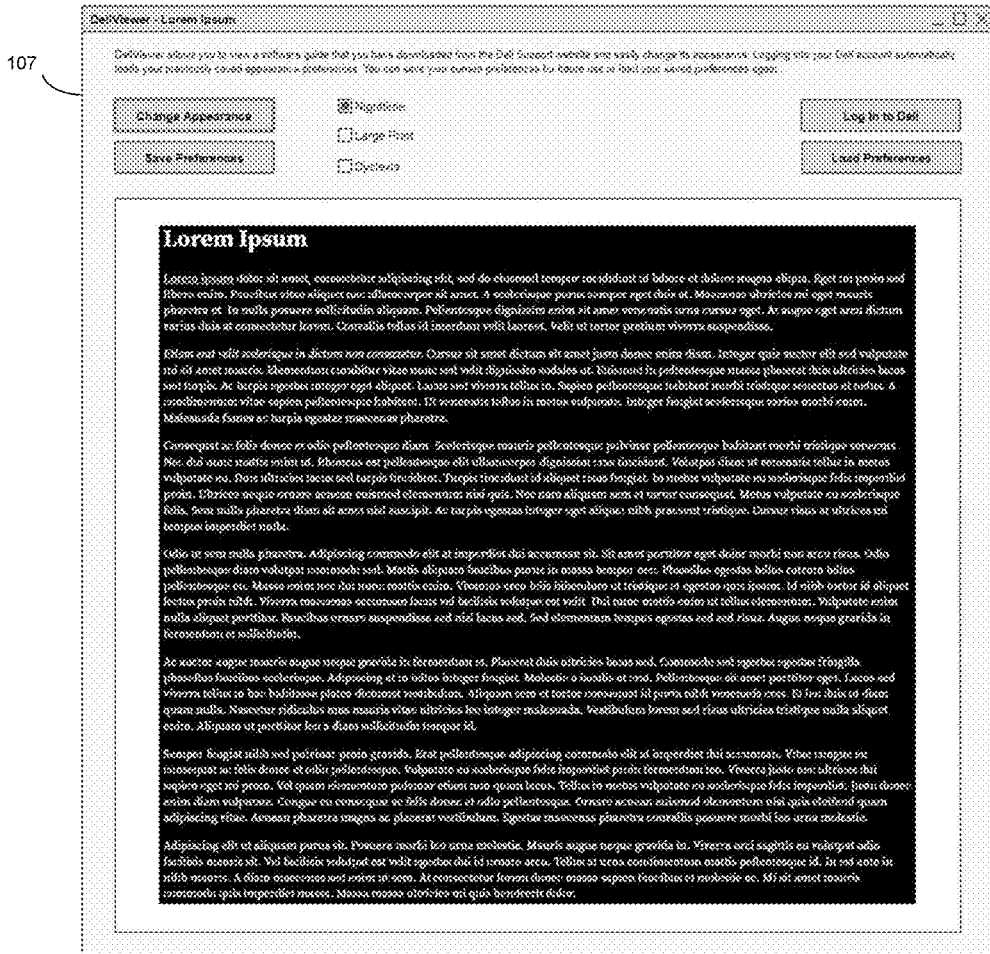
FIG. 6 shows an example graphical user interface of a content viewer with a Nighttime modification selection applied in an illustrative embodiment.

In an example embodiment, at least one modification selection is preset to assist users with viewing difficulties. For example, in FIG. 4, the user may check off the "Dyslexia" selection modification to apply the Dyslexia modification to the rendering of the content in the graphical user interface. The Dyslexia modification renders the content with the Dyslexia font, which is specially designed for people with Dyslexia to enhance the ease of reading and comprehension. In an example embodiment, at least one modification selection facilitates the user in viewing the content in the graphical user interface. In FIG. 5, for example, the user may check off the "Large Print" selection modification to apply the "Large Print" modification to the rendering of the content in the graphical user interface. In FIG. 6, for example, the user may check off the "Nighttime" selection modification apply the "Nighttime" modification to the rendering of the content in the graphical user interface. In an example embodiment, there may be additional preset selection modifications (not shown) to assist with various disabilities and/or viewing difficulties. For example, one of the selection modifications may change the colors of the content so as to make it readable for users who are color-blind. The selection modifications may enable, for example, the user to change the color of the hyperlinks or underline all the hyperlinks in the content to make them more readable for the user. One of the selection modifications may be a text to voice option so that the user may hear the content being read instead of viewing the content. One of the selection modifications options may be a text to Braille device for those with impaired vision. One of the selection modifications may be to translate the content into a different language. In an example embodiment, the user may select one or more selection modifications at the same time to be applied to the content in the graphical user interface.

In an example embodiment, in response to receiving, via the graphical user, modification to the rendering of the content, the content viewer 107 stores the received modification in a user profile repository, where the received modifications are associated with a user requesting the received content. For example, when the content viewer 107 receives the users preferred modifications, the content viewer system 101 transmits those preferred modifications from the content viewer 107 to a content repository 105. Likewise, in another example embodiment, when the content viewer 107 receives a selection from the graphical user interface to load stored modification into the graphical user interface, the content viewer system 101 accesses the stored modifications from the user profile repository 106, and then applies the stored modifications to the rendering of the content in the content viewer (i.e., applies the stored modifications to the rendering of the content in the graphical user interface). For example, in FIGS. 3, 4, 5, and 6, the user may select the "Load Preferences" button to load the stored modifications. In another example embodiment, when the content viewer system 101 renders the content in the content viewer 107, the content viewer system 101 automatically accesses the stored modifications from the user profile repository 106, and applies the stored modifications to the rendering of the content in the content viewer.

In an example embodiment, the content viewer system 101 detects that the user is logged into a user account when requesting the received content. The user may be logged into a user account associated with the computerized device (i.e., the user system 103) from which the user is requesting the content. The user may be logged into a corporate account, etc. In an example embodiment, when the content viewer system 101 detects that the user is logged into a user account, the content viewer system 101 accesses the stored modification from the user profile repository 105. For example, when a user logs into their user account, their saved style preferences are automatically loaded and applied to the content rendered in the content viewer 107. The user may also make further style changes, and save these changes to their user account, for example, a cloud account.

In an example embodiment, the content viewer system 101 may receive a login selection from the graphical user interface from the user. For example, in FIGS. 3, 4, 5, and 6, the user may select the "Log in to Dell" button from the graphical user interface to log into their user account. In response, the content viewer system 101 logs the user into their user account, and accesses the stored modification from the user profile repository 106.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

FIG. 3 illustrates an example graphical user interface of a content viewer 107 comprising several interactive selections, and a viewing section in which to render the content. The interactive selections in the content viewer 107 may be represented by, but are not limited to, buttons, check boxes, drop down menus, tabs, etc. The content viewer 107 comprises selection modifications to modify the appearance of the content within the graphical user interface. In an example embodiment, the user may modify the appearance of the content by selecting the "Change Appearance" button. When the user selects the "Change Appearance" button, the content viewer 107 displays the available selection modification buttons. The selection modifications may include, but are not limited to font size, font face (i.e., allowing a user to input their own font to apply to the content even when that font is not installed on the user's computer), text spacing, text color, spacing, indentation of chapter and heading text, adding bullets to make content more readable, presentation of hyperlinks, restyling some of the content (i.e., "Notes" and "Caution") to have different colored font so as to stand out better, etc. Once the modification selections are made to the user's preferences, the user may select the "Save Preferences" button to save the user's preferences for future viewings of content. At any time, the user may modify their preferences and, again, save their preferences. The user may select the "Load Preferences" button to load previously saved preferences. If the user is logged into their user account, the content viewer system 101 may access the saved preferences from the user profile repository 106. If the user is not yet logged into their user account, the user may select the "Log into Dell" button to log into their user account. In an example embodiment, if the user is not logged into their user account, the content viewer 107 may store the previously saved preferences locally, and apply those saved preferences to content rendered in the content viewer 107.

In an example embodiment, the user may change the appearance of the interface itself, for example, but not limited to, change the color of text of the graphical user interface itself.

FIG. 4 illustrates an example graphical user interface of a content viewer 107 comprising several interactive selections, and a viewing section in which to render the content. The content viewer 107 also includes selection modifications of "Nighttime", "Large Print", and "Dsylexia". In an example embodiment, the user may check off the "Dyslexia" selection modification to apply the Dyslexia modification to the rendering of the content in the graphical user interface. The Dyslexia modification renders the content with the Dyslexia font, which is specially designed for people with Dyslexia to enhance the ease of reading and comprehension.

FIG. 5 illustrates an example graphical user interface of a content viewer 107 comprising several interactive selections, and a viewing section in which to render the content. The content viewer 107 also includes selection modifications of "Nighttime", "Large Print", and "Dsylexia". In an example embodiment, the user may check off the "Large Print" selection modification to apply the "Large Print" modification to the rendering of the content in the graphical user interface. In this example embodiment, selecting the "Large Print" selection modification renders the content in the graphical user interface with larger font to facilitate those with vision problems. The "Large Print" selection modification assists users with vision problems more easily make out what they are reading. For example, the typical normal font size of 12 is increased to 16. Additionally, other elements in the content may be restyled, such as adding more whitespace between words and lines of text.

FIG. 6 illustrates an example graphical user interface of a content viewer 107 comprising several interactive selections, and a viewing section in which to render the content. The content viewer 107 also includes selection modifications of "Nighttime", "Large Print", and "Dsylexia". In an example embodiment, the user may check off the "Nighttime" selection modification to apply the "Nighttime" modification to the rendering of the content in the graphical user interface. The "Nighttime" modification reverses the normal color palette of all elements. For example, black text on a white background becomes white text on a black background. This color reversal can reduce eye strain when reading in low-light environments. In an example embodiment, the user many select any and all of the selection modifications of "Nighttime", "Large Print", and "Dsylexia", and any other selection modifications that may be present in the content viewer 107. In an example embodiment, as soon as a user selects any of the selection modifications, (i.e., "Nighttime", "Large Print", "Dsylexia", etc.), those changes are automatically applied to the content.

The above-described illustrative embodiments provide significant advantages relative to conventional approaches. For example, some embodiments are configured to significantly improve accessibility of content for users, particularly users with disabilities. These and other embodiments can effectively improve content access and viewing relative to conventional approaches. For example, embodiments disclosed herein provide an automated, comprehensive accessible content viewer. Embodiments disclosed herein provide a convent viewer system that downloads a self-extracting executable filed that provides a content viewer bundled with the content. Embodiments disclosed herein provide a consistent experience when downloading content, providing the ability to customize the appearance of the downloaded content ensuring that the content will look exactly as the user desires each time the user downloads the content providing accessibility to users with disability who may find it difficult and cumbersome to modify content to their default preferred formatting, and allow users with limited technical knowledge to quickly and easily change the appearance of any aspect of the content as well as the appearance of the content viewer itself.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of the information processing system 100, these platforms may also be used to implement at least portions of other information processing systems in other embodiments.

Figure 7:
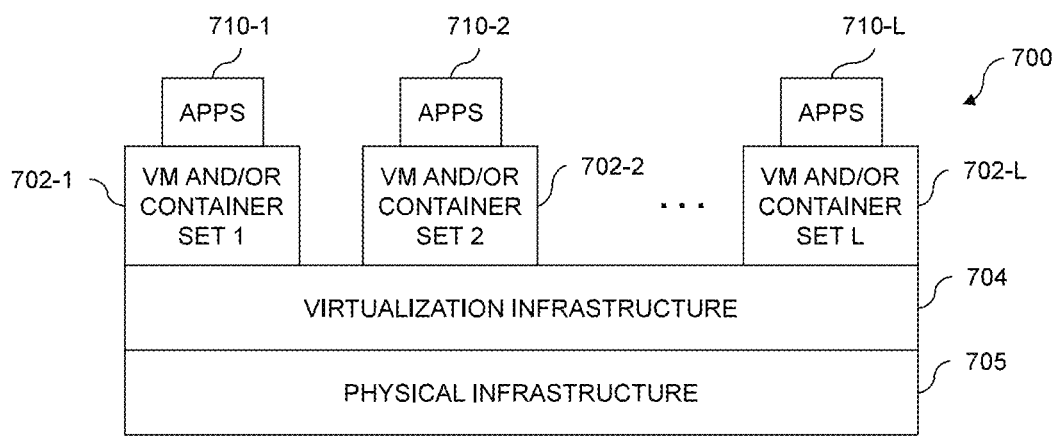
FIGS. 7 and 8 show examples of processing platforms that may be utilized to implement at least a portion of a content viewer system embodiments.
Figure 8:
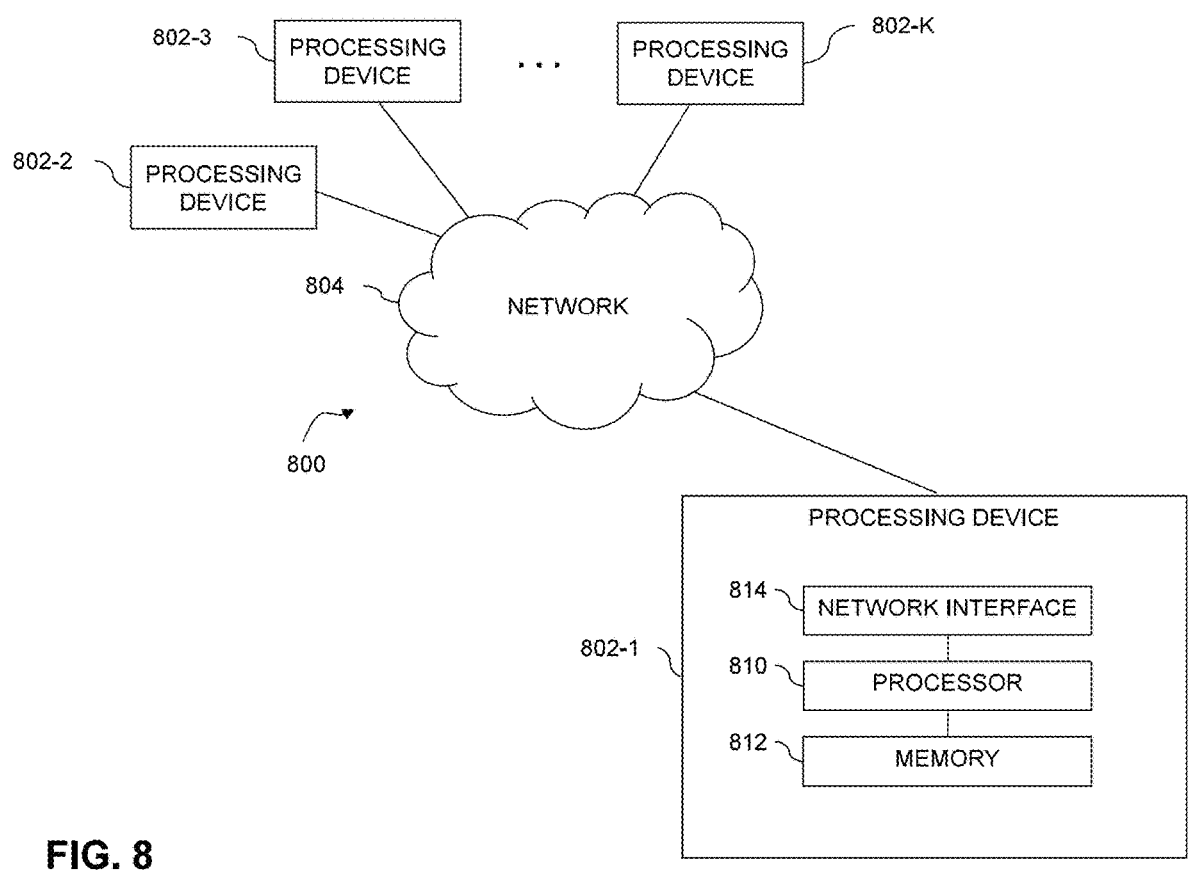

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, where the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of the information processing system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

in response to a request to render online content in a browser, receiving a download comprising a self-extracting file for execution, wherein the download comprises a content viewer in which to render the content, the content viewer comprising the content and a graphical user interface, wherein the self-extracting file is executed and launched as the content viewer, wherein the content is rendered in the content viewer instead of in the browser as requested, wherein the content viewer comprises controls for modifying an appearance of how the content is rendered in the content viewer instead of the browser as requested, wherein the controls comprise a "Change Appearance" button, wherein the modifying comprises modification to Cascading Style Sheets (CSS) styles used to manipulate a Hypertext Markup Language (HTML) presentation of the content and wherein selection of the "Change Appearance" button results in the modifying; and rendering the content in the launched content viewer, wherein the content viewer applies saved content viewing preferences to the content rendered in the content viewer, wherein the method is implemented by at least one processing device comprising a processor coupled to a memory.

2. The method of claim 1 further comprising:

receiving, via the graphical user, modification to the rendering of the content; and applying the received modification to the rendered content.

3. The method of claim 2 wherein receiving, via the graphical user, modification to the rendering of the content comprises:

storing the received modification in a user profile repository, wherein the received modifications are associated with a user requesting the received content.

4. The method of claim 2 wherein applying the received modification to the rendered content comprises:

modifying an appearance of the content within the graphical user interface.

5. The method of claim 2 wherein receiving, via the graphical user, modification to the rendering of the content comprises:

receiving at least one modification selection from the graphical user interface from a user; and applying the at least one modification selection to the rendering of the content in the graphical user interface.

6. The method of claim 5 wherein the at least one modification selection facilitates the user in viewing the content in the graphical user interface.

7. The method of claim 5 wherein the at least one modification selection is preset to assist users with viewing difficulties.

8. The method of claim 1 wherein receiving the content viewer in which to render the content comprises:

receiving, by the content viewer system, the content from a content provider, wherein the content provider accesses the content from a content repository;

creating, by the content viewer system, the content viewer comprising the content and the graphical user interface; and transmitting the content viewer in response to the request.

9. The method of claim 1 wherein rendering the content in the content viewer comprises:
receiving a selection from the graphical user interface to load stored modification into the graphical user interface; and
applying the stored modifications to the rendering of the content in the graphical user interface.

10. The method of claim 1 wherein rendering the content in the content viewer comprises:
accessing stored modifications from a user profile repository, wherein the stored modifications are associated with a user requesting the received content; and
applying the stored modifications to the rendering of the content in the content viewer.

11. The method of claim 10 wherein accessing the stored modifications from the user profile repository comprises:
detecting the user is logged into a user account when requesting the received content; and
based on the logged status, accessing the stored modification from the user profile repository.

12. The method of claim 10 wherein accessing the stored modifications from the user profile repository comprises:
receiving a login selection from the graphical user interface from the user;
logging the user into a user account; and
accessing the stored modification from the user profile repository.

13. The method of claim 1 wherein rendering the content in the content viewer comprises:
downloading the content viewer as a self-extracting file for execution on a computer device from which the request originated.

14. The method of claim 1 wherein the request to render online content in the browser is a request to download the content viewer from the browser.

15. The method of claim 1 wherein the request to render online content in the browser is a request to render online content offline.

16. The method of claim 1 wherein the content is a HyperText Markup Language (HTML) presentation of the content and wherein the modifications are modifications to Cascading Style Sheets (CSS) styles used to manipulate the HTML presentation of the content.

17. A system comprising:
at least one processing device comprising a processor coupled to a memory;
the at least one processing device being configured:
in response to a request to render online content in a browser, to receive a download comprising a self-extracting file for execution, wherein the download comprises a content viewer in which to render the content, the content viewer comprising the content and a graphical user interface, wherein the self-extracting file is executed and launched as the content viewer, wherein the content is rendered in the content viewer instead of in the browser as requested, wherein the content viewer comprises controls for modifying an appearance of how the content is rendered in the content viewer instead of the browser as requested, wherein the controls comprise a "Change Appearance" button, wherein the modifying comprises modification to Cascading Style Sheets (CSS) styles used to manipulate a Hypertext Markup Language (HTML) presentation of the content and wherein selection of the "Change Appearance" button results in the modifying; and
to render the launched content viewer, wherein the content viewer applies saved content viewing preferences to the content rendered in the content viewer.

18. The system of claim 17 wherein the at least one processing device configured to render the content in the content viewer is further configured to:
download the content viewer as a self-extracting file for execution on a computer device from which the request originated.

19. A computer program product comprising a non-transitory processor-readable storage medium having stored therein program code of one or more software programs, wherein the program code when executed by at least one processing device causes said at least one processing device:
in response to a request to render online content in a browser, to receive a download comprising a self-extracting file for execution, wherein the download comprises a content viewer in which to render the content, the content viewer comprising the content and a graphical user interface, wherein the self-extracting file is executed and launched as the content viewer, wherein the content is rendered in the content viewer instead of in the browser as requested, wherein the content viewer comprises controls for modifying an appearance of how the content is rendered in the content viewer instead of the browser as requested, wherein the controls comprise a "Change Appearance" button, wherein the modifying comprises modification to Cascading Style Sheets (CSS) styles used to manipulate a Hypertext Markup Language (HTML) presentation of the content and wherein selection of the "Change Appearance" button results in the modifying; and
to render the launched content viewer, wherein the content viewer applies saved content viewing preferences to the content rendered in the content viewer.

\* \* \* \* \*